(12) United States Patent
Hasumi et al.

(10) Patent No.: US 6,619,415 B1
(45) Date of Patent: Sep. 16, 2003

(54) COWLING UNIT OF MOTORCYCLE

(75) Inventors: Hiroaki Hasumi, Saitama (JP); Yutaka Ohta, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/655,338

(22) Filed: Sep. 5, 2000

(30) Foreign Application Priority Data

Sep. 5, 1999 (JP) .............................. 11-291425

(51) Int. Cl.⁷ .............................................. B60K 11/00
(52) U.S. Cl. ..................................... 180/68.1; 296/78.1
(58) Field of Search ............................. 180/68.1, 89.17, 180/219, 229, 68.4, 68.6; 296/78.1, 180.1

(56) References Cited

U.S. PATENT DOCUMENTS

| | | | |
|---|---|---|---|
| 4,709,774 A | * 12/1987 | Saito et al. ................. 180/229 |
| 4,770,460 A | * 9/1988 | Miura et al. ............... 296/78.1 |
| 4,913,256 A | * 4/1990 | Sakuma ...................... 180/229 |
| 5,269,243 A | * 12/1993 | Mochizuki .................. 123/305 |
| 5,301,767 A | * 4/1994 | Shiohara ..................... 180/219 |
| 5,323,869 A | * 6/1994 | Kurayoshi et al. .......... 180/219 |
| 5,577,570 A | * 11/1996 | Shiohara et al. ............ 180/219 |
| 5,715,778 A | * 2/1998 | Hasumi et al. .......... 123/196 A |
| 6,042,171 A | * 3/2000 | Hesse ........................ 296/78.1 |
| 6,332,505 B1 | * 12/2001 | Tateshima et al. .......... 180/229 |

FOREIGN PATENT DOCUMENTS

| | | |
|---|---|---|
| EP | 0 462 511 A1 | 12/1991 |
| JP | Y2-5930781 | 9/1984 |
| JP | 01289780 | * 11/1989 |
| JP | 02128972 | * 5/1990 |
| JP | 03067797 | * 3/1991 |
| JP | U452990 | 5/1992 |
| JP | 05201375 | * 8/1993 |
| JP | 05338571 | * 12/1993 |
| JP | 2001071963 | * 3/2001 |

OTHER PUBLICATIONS

Patent Abstract of Japan, Pub. No. 11278344, Pub. Date: Oct. 12, 1999.

Patent Abstract of Japan, Pub. No. 09076967, Pub. Date: Mar. 25, 1997.

Patent Abstract of Japan, Pub. No. 06156348, Pub. Date: Jun. 3, 1994.

\* cited by examiner

*Primary Examiner*—Brian L. Johnson
*Assistant Examiner*—Christopher Bottorff
(74) *Attorney, Agent, or Firm*—Birch, Stewart, Kolasch & Birch, LLP

(57) ABSTRACT

It is the object of the present invention to increase the opening area of an air introducing opening without increasing running resistance. An air introducing opening is made at the front of an upper cowling, and side radiators and front forks are exposed to left and right sides behind the air introducing opening when viewed from the front side. Air guide walls overhanging the air introducing opening from the left and right sides of a nose portion and covering the front portion of the front forks are integrally formed with the cowling to guide running air to the side radiators.

16 Claims, 5 Drawing Sheets

COWLING UNIT OF MOTORCYCLE

BACKGROUND OF THE INVENTION

1. Field of the Invention

The present invention relates to a cowling unit of a motorcycle having an air introducing opening at the front of a cowling and a radiator in the cowling behind the air introducing opening and, in particular, a cowling unit capable of reducing running resistance.

2. Description of the Background Art

Japanese Utility Model Laid-Open No. S59-30781 shows an example of a cowling unit. In this example, side radiators are arranged on both sides of a cowling and take air from an air introducing opening at the front of the cowling and discharge the air after cooling the side radiators outside a vehicle from air discharging ports overlapping the side radiators. Japanese Utility Model Laid-Open No. H4-52990 discloses an example in which air guide plates are arranged on both sides of the air introducing port of a cowling to guide air to a rider side.

In the case of a radiator of the type introducing air from an air introducing opening to cool a radiator, in order to improve cooling efficiency, it is conceived to increase the opening area of the air introducing opening. However, if the opening area of the air introducing opening is increased, members arranged behind the air introducing opening such as a front fork or the like are more exposed to air and increase running resistance. Accordingly, it is necessary to reduce the running resistance at the same time when the opening area of the air introducing opening is increased. It is difficult to ensure the clearance between the lower portion of the headlight and the front fender of the cowling and hence the shape of the cowling is also constrained. In this point, the circumstances are the same, to one degree or another, even in the case where a motorcycle is provided with side radiators.

SUMMARY OF THE INVENTION

It is therefore an object of the present invention to reduce running resistance and to improve cooling efficiency. In order to solve the above problem, a cowling unit of a motorcycle in accordance with the first aspect of the present invention is characterized in that, in the motorcycle comprising a cowling covering the front portion of a vehicle body and both sides of an engine and having an air introducing opening at its front portion and a radiator mounted in the cowling at the back of the air introducing opening, the present invention utilizes left and right air guide walls mounted on the cowling and overhanging the upper portion of the air introducing opening from left and right sides to cover a pair of left and right front forks at their front portions.

The second aspect is characterized in that, according to the first aspect, the air guide walls guide air flowing toward the radiator. The third aspect is characterized in that, according to the second aspect, the radiator is a side radiator.

According to the first aspect, air guide walls overhanging the air introducing port and covering the front portion of the front forks are mounted on the left and right sides of the upper portion of the cowling and, hence, even if the air introducing opening is enlarged, the air guide walls can reduce the degree of exposure of the front forks to prevent an increase in running resistance. Accordingly, this cowling can prevent an increase in running resistance and enlarge the air introducing opening at the same time to improve cooling efficiency to the radiator.

According to the second aspect, since the air guide walls guide running air toward the radiator, they can further improve cooling efficiency. According to the third aspect, since the side radiator is provided, it can reduce the running resistance caused by the radiator. Accordingly, the opening area of the air introducing opening can be further enlarged to further improve cooling efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
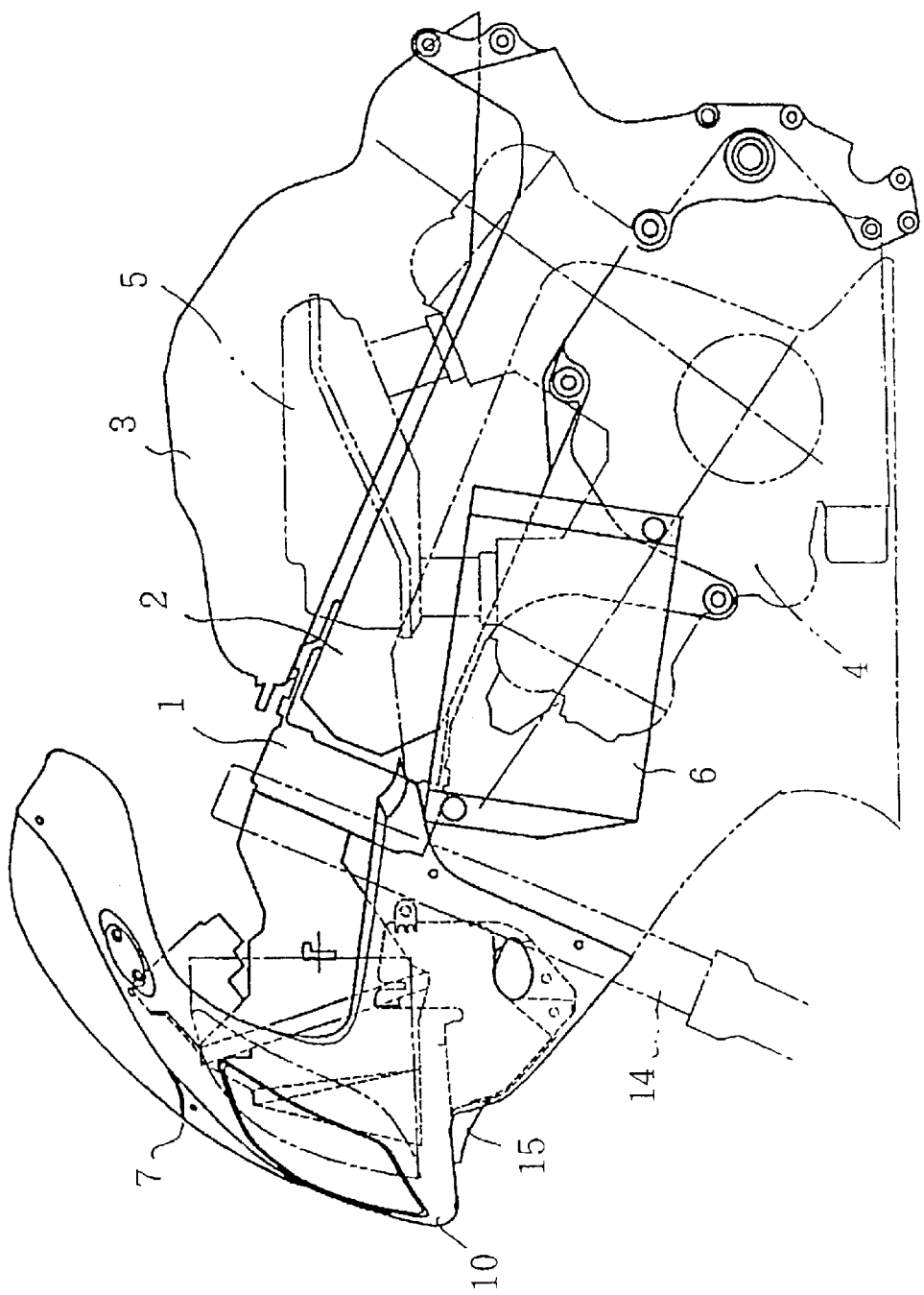
FIG. 1 is a side view of the front portion of the vehicle body of a motorcycle in accordance with the preferred embodiment.
Figure 2:
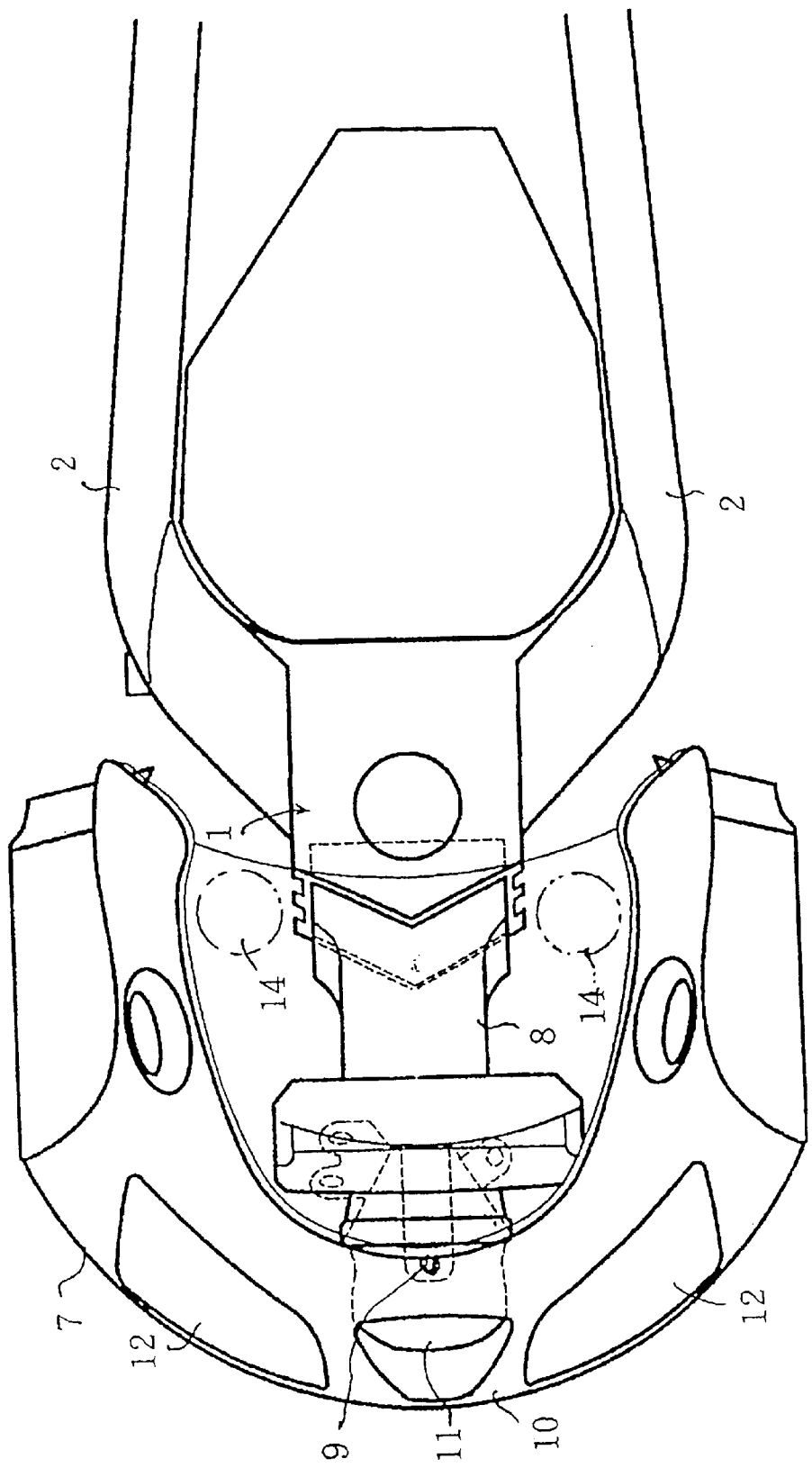
FIG. 2 is a plan view of the front portion of the vehicle body of a motorcycle in accordance with the preferred embodiment.

One preferred embodiment of the present invention will be described below with reference to the drawings. This motorcycle includes a head box 1 also serving as an air intake passage, and a pair of main frames 2 bifurcating and extending to the left and right sides. A fuel tank 3 is supported on the main frames 2, and a V-type water-cooled 4-cycle engine 4 is mounted under the main frames 2. An air cleaner 5 is arranged between the left and right main frames 2 and between the fuel tank 3 and the engine 4. Side radiators 6 are mounted on both sides of the engine 4 with their cooling faces oriented vertically in parallel to the front-to-rear direction of the vehicle body and are supported by the main frames 2.

Figure 3:
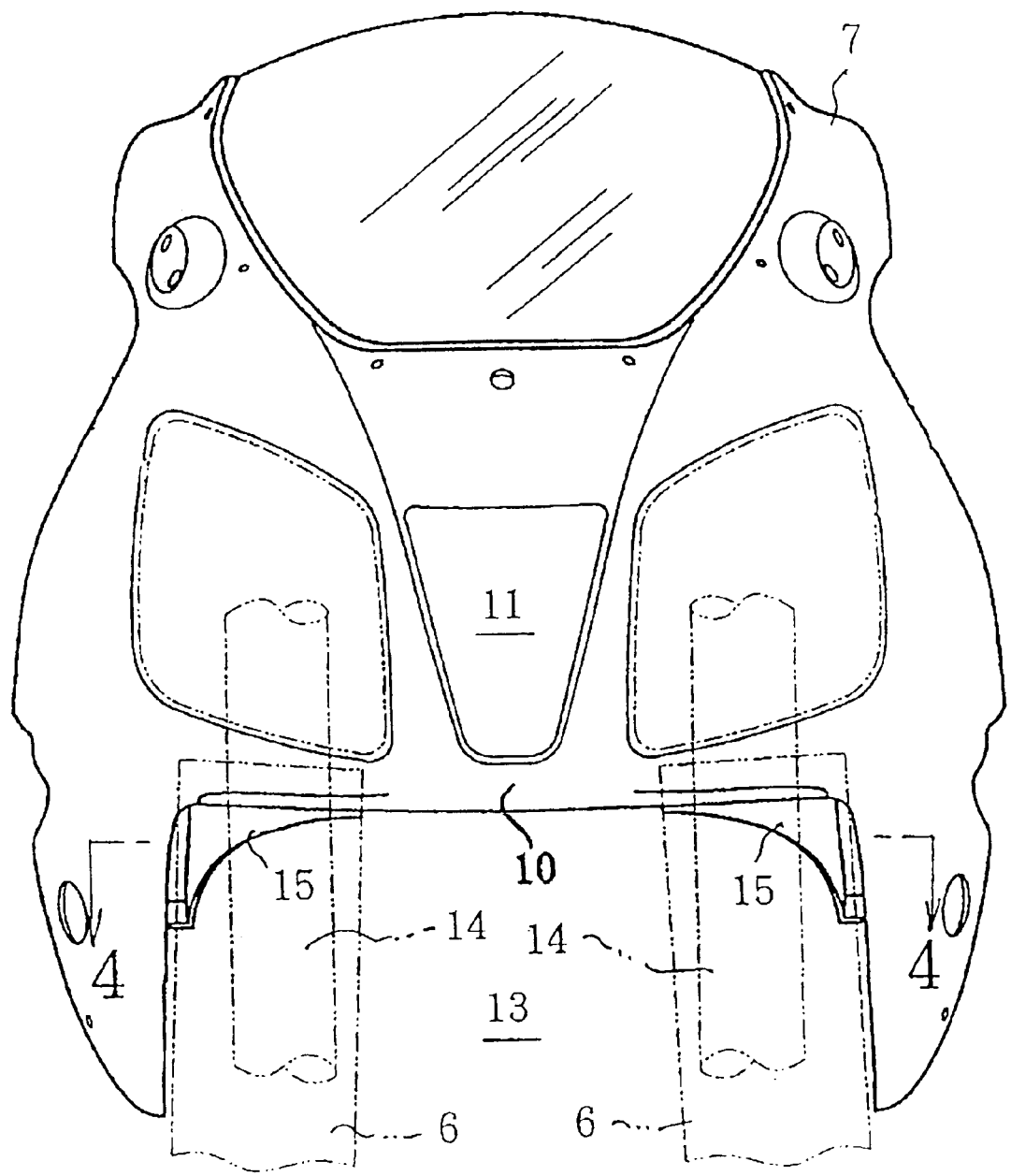
FIG. 3 is a front view of a cowling.

Further, the motorcycle is provided with a cowling 7 covering both sides of the side radiators 6 and the engine 4 and the front portion of the vehicle body. The cowling is fixed, with a bolt 9, to an air intake duct 8 made of resin and extending forward from the head box 1 in the front center of an upper cowling 7 constituting the front portion of the cowling. The upper cowling 7, as shown in FIG. 3, is formed into a nose portion 10 bulging forward at the front of the head box 1 and has an air intake 11 in the center which communicates with the air intake duct 8. The cowling 7 also includes a pair of openings made on both the left and right sides of the air intake 11, and headlights 12 built in the openings.

An air introducing opening 13 is located under the nose portion 10 having a large opening area, through which parts of the side radiators 6 and left and right front forks 14 can be seen from the front side, both of which are provided in the upper cowling 7. A pair of air guide walls 15 are integrally formed with the upper cowling 7 which overhang the left and right sides of the upper end portion of the air introducing opening 13 from both left and right end portions of the nose portion 10 facing the air introducing opening 13.

Figure 4:
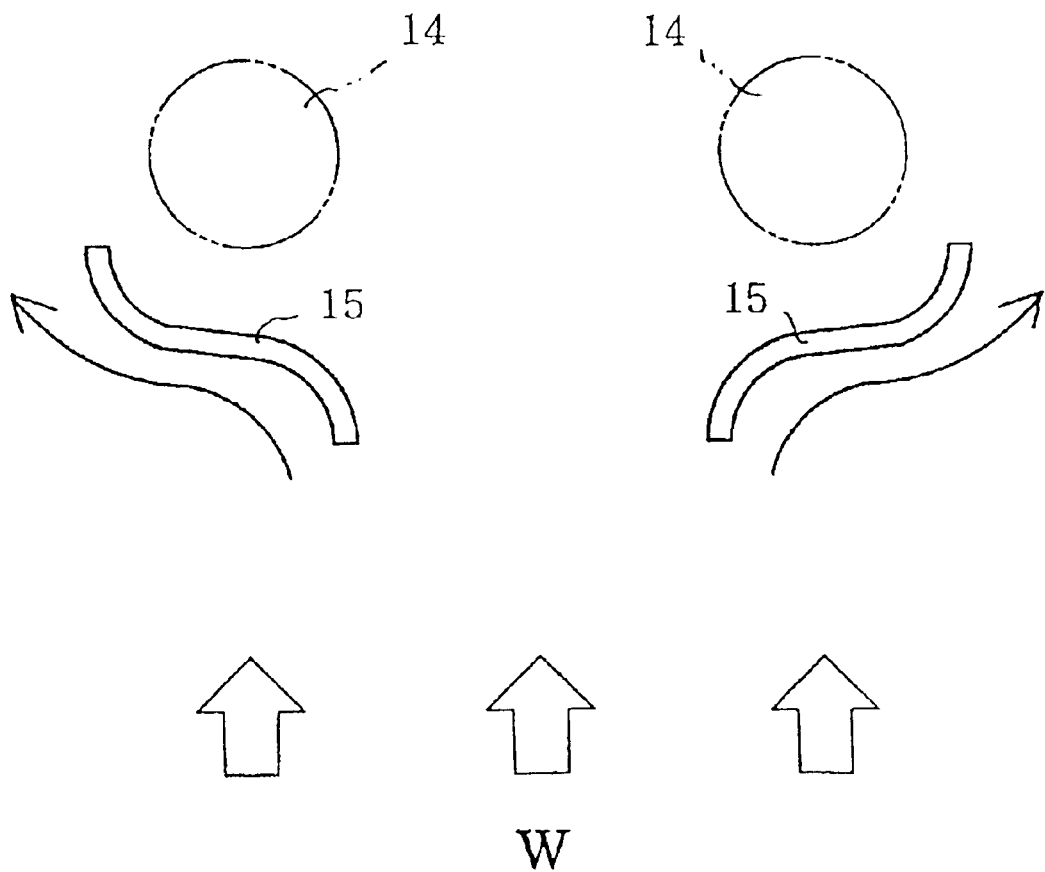
FIG. 4 is a cross-sectional view taken on a line 4—4 in FIG. 3.

As shown in FIG. 4, each of the air guide walls 15 is shaped like a letter S and covers the front side of the front fork 14. The left and right air guide walls 15 are inclined forward such that they get close to each other and overlap the portions of the side radiators 6 when viewed from the front side. The left and right air guide walls 15 are separated from each other and it is sufficient that each of the air guide walls 15 is mounted before the side radiator 6 and the front fork 14 at the position where the side radiator 6 overlaps the front fork 14 and nothing is formed between the air guide walls 15. The air guide wall 15 has a smooth curved surface designed to make running air a laminar flow and to guide it to the side radiator 6.

Next, the action of the present preferred embodiment will be described. In FIG. 4, running air W travels in a laminar flow by the surface of the air guide wall 15 and bypasses the front fork 14 arranged behind the air guide wall 15 and smoothly flows rearward. This can reduce the degree of exposure of the front forks 14 and reduces the running resistance. Therefore, the opening area of the air introducing opening 13 can be increased without increasing the running resistance to improve cooling efficiency.

Because the running air W is made into a laminar flow by the air guide walls 15 and is guided toward the side radiators 6 arranged rearwardly thereof, it can effectively cool the side radiators 6. For this reason, since the side radiators 6 inherently having small running resistance are used and hence the running resistance can be further reduced by the air guide walls 15, the flexibility of the layout of the vehicle body can be increased. Furthermore, the air guide wall 15 is not provided at the center of the air introducing opening 13 which does not contribute to a reduction in the running resistance of the front forks 14. The lack of an air guide wall in the center of the air introducing opening 13 contributes to the increased opening area of the air introducing opening 13.

Figure 5A:
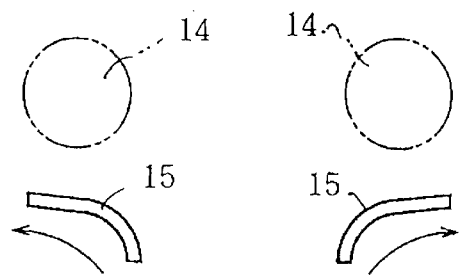
FIGS. 5A–5C are illustrations of other alternative embodiments in correspondence with FIG. 4.
Figure 5B:
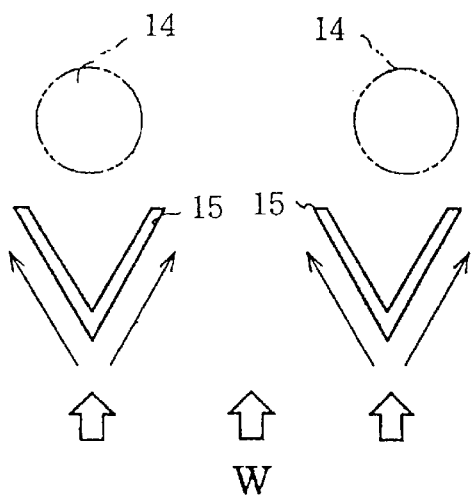
Figure 5C:
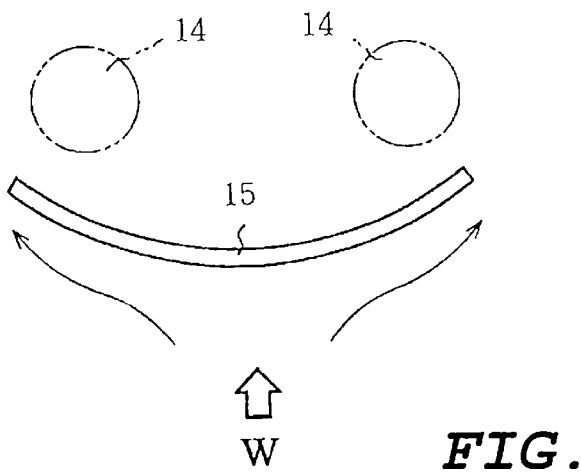

FIGS. 5A–5C show other alternative embodiments related to the shape of the air guide wall 15 which correspondence with FIG. 4. First, in an example shown in FIG. 5A, the air guide wall 15 is shaped like a letter J. According to this example, the air guide wall 15 forms a smooth curved surface and hence can further increase the effect of laminar flow. In the example shown in FIG. 5B, the air guide wall 15 is shaped like an arrow projecting forward and can reduce also the running resistance of the air guide wall 15 itself. In the example shown in FIG. 5C, the left and right air guide walls 15 are connected to each other to form a single curved air guide wall bulging forward and, when the opening area of the air introducing opening 13 can be sufficiently ensured, the air guide wall 15 is effective to further increase the amount of air introduced into the side radiators 6.

In each of the above alternative embodiments, the same reference characters designate the same parts or portions as in the preferred embodiment, and the constitution other than the above-described differences is common to each of the preferred and alternative embodiments.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cowling unit of a motorcycle comprising:

a cowling covering a front portion of the motorcycle and both sides of an engine, said cowling including a nose portion formed at a forward location of the motorcycle and an air introducing opening formed below the nose portion, the air introducing opening being bordered by edges including an upper edge;

a radiator mounted in the cowling; and left and right air guide walls forming part of the upper edge of the air introducing opening and extending downward on left and right sides of the air introducing opening, as viewed from a front of the motorcycle and being offset to a rear of the motorcycle relative to the upper edge of the air introducing opening, as viewed from a top of the motorcycle, wherein the left and right guide walls cover front sides of a pair of left and right front forks, and guide running air toward the radiator.

2. The cowling unit of a motorcycle as claimed in claim 1, wherein the radiator is a side radiator, having an air receiving face oriented parallel to a longitudinal centerline of the motorcycle.

3. The cowling unit of a motorcycle as claimed in claim 1, wherein the left and right air guide walls are integrally formed with the cowling.

4. A cowling unit for a motorcycle, said motorcycle having a body including a pair of front fork members, said motorcycle further having at least one radiator, said cowling unit comprising:

a cowling member for partially covering the pair of front fork members and a front portion of the body of the motorcycle, the cowling member including a nose portion formed at a forward location of the motorcycle;

an air introducing opening located in said cowling member, the air introducing opening being bordered by edges including an upper edge and being located below the nose portion, for directing air to the at least one radiator; and a pair of air guide walls, integrally formed with said cowling member and forming part of the upper edge, as viewed from a front of the motorcycle, and being offset to a rear of the motorcycle relative to the upper edge of the air introducing opening, as viewed from a top of the motorcycle, the pair of guide walls extending down on left and right sides of said air introducing opening to cover front sides of the front fork members and deflect air therearound toward the at least one radiator.

5. The cowling unit as set forth in claim 4, wherein each air guide wall has a smooth curved surface.

6. The cowling unit as set forth in claim 5, wherein said air guide walls are separated from one another.

7. The cowling unit as set forth in claim 6, wherein a height of each of said air guide walls increases as viewed from the front of the motorcycle and moving laterally outwardly along said air guide walls.

8. The cowling unit as set forth in claim 7, wherein each of said air guide walls has a cross-section in the shape of the letter S.

9. The cowling unit as set forth in claim 7, wherein each of said air guide walls has a cross-section in the shape of the letter J.

10. The cowling unit as set forth in claim 7, wherein each of said air guide walls has a cross-section in the shape of the letter V.

11. The cowling unit as set forth in claim 4, wherein said air guide walls are separated from one another.

12. The cowling unit as set forth in claim 4, wherein a height of each of said air guide walls increases as viewed from the front of the motorcycle and moving laterally outwardly along said air guide walls.

13. The cowling unit as set forth in claim 4, wherein each of said air guide walls has a cross-section in the shape of the letter S.

14. The cowling unit as set forth in claim 4, wherein each of said air guide walls has a cross-section in the shape of the letter J.

15. The cowling unit as set forth in claim 4, wherein each of said air guide walls has a cross-section in the shape of the letter V.

16. The cowling unit as set forth in claim 4, wherein said pair of air guide walls are connected together.

* * * * *